United States Patent
Emele et al.

(10) Patent No.: US 10,025,954 B2
(45) Date of Patent: Jul. 17, 2018

(54) METHOD FOR OPERATING A CONTROL UNIT

(71) Applicant: Robert Bosch GmbH, Stuttgart (DE)

(72) Inventors: Martin Emele, Stuttgart (DE); Thomas Keller, Rottweil (DE); Andreas Soenkens, Remseck am Neckar (DE); Stefan Schneider, Moensheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 158 days.

(21) Appl. No.: 14/705,308

(22) Filed: May 6, 2015

(65) Prior Publication Data

US 2015/0324583 A1    Nov. 12, 2015

(30) Foreign Application Priority Data

May 12, 2014 (DE) .......................... 10 2014 208 838

(51) Int. Cl.
| | | |
|---|---|---|
| G06F 21/57 | (2013.01) | |
| G06F 21/72 | (2013.01) | |
| G06F 21/55 | (2013.01) | |
| G06F 8/65 | (2018.01) | |
| G06F 9/445 | (2018.01) | |
| G06F 8/654 | (2018.01) | |
| H04L 29/06 | (2006.01) | |

(52) U.S. Cl.
CPC ............. *G06F 21/72* (2013.01); *G06F 8/654* (2018.02); *G06F 8/66* (2013.01); *G06F 8/665* (2013.01); *G06F 21/554* (2013.01); *G06F 21/572* (2013.01); *H04L 63/123* (2013.01); *G06F 2221/033* (2013.01); *G06F 2221/2105* (2013.01)

(58) Field of Classification Search
CPC ...... G06F 21/72; G06F 21/572; G06F 21/554; G06F 8/66; G06F 8/665; G06F 2221/2105; G06F 2221/033; H04L 63/123
See application file for complete search history.

(56) References Cited

U.S. PATENT DOCUMENTS

| | | | | |
|---|---|---|---|---|
| 5,422,632 A | * | 6/1995 | Bucholtz ................ | B60R 25/04 307/10.3 |
| 5,787,367 A | * | 7/1998 | Berra ...................... | B60R 25/04 380/28 |
| 6,213,396 B1 | * | 4/2001 | Thoreau ............... | G06Q 20/346 235/380 |
| 9,038,151 B1 | * | 5/2015 | Chua ........................ | H04L 45/02 709/223 |
| 2001/0027524 A1 | * | 10/2001 | Krauter ............... | F02D 41/2425 726/26 |
| 2009/0222136 A1 | * | 9/2009 | Lou ........................ | G05B 13/04 700/272 |
| 2014/0108786 A1 | * | 4/2014 | Kreft ....................... | G06F 21/71 713/156 |

(Continued)

FOREIGN PATENT DOCUMENTS

WO    WO 2012107346 A1 *   8/2012   ............ B60R 25/04

*Primary Examiner* — Meng Li
(74) *Attorney, Agent, or Firm* — Norton Rose Fulbright US LLP; Gerard Messina

(57) ABSTRACT

A method for operating a control unit, such a control unit, and an electronic hardware security module are provided. A manipulation of a main computer unit is detected by the electronic hardware security module, and a check takes place whether reprogramming is possible.

19 Claims, 4 Drawing Sheets

(56) References Cited

U.S. PATENT DOCUMENTS

2014/0115487 A1* 4/2014 Sandler ............... H04M 1/7253
                                                    715/740
2014/0298331 A1* 10/2014 Shimogawa ........ G06F 9/45533
                                                    718/1

* cited by examiner

METHOD FOR OPERATING A CONTROL UNIT

CROSS REFERENCE TO RELATED APPLICATION

The present application claims priority to Application No. DE 10 2014 208 838.0, filed in the Federal Republic of Germany on May 12, 2014, which is incorporated herein in its entirety by reference thereto.

FIELD OF INVENTION

The present invention relates to a method for operating a control unit; it also relates to such a control unit and an electronic hardware security module, which is utilized in a control unit. The control unit is used in a motor vehicle, in particular.

BACKGROUND INFORMATION

Control units are electronic modules which, for instance, are used in motor vehicles for the control and regulation of functional sequences. For this purpose the control units are assigned to the particular components of the motor vehicle whose operation will be controlled with the aid of the assigned control unit. In order to do so, the control unit reads in data acquired by sensors and influences the operation by controlling actuators.

The described method is used in conjunction with an electronic security module which is utilized in a control unit, especially in the automotive field, in security-relevant areas. In most applications in the security-relevant areas the manipulation-proof or non-monitorable storing of data is an essential requirement. Cryptographic keys, which are utilized in symmetrical or asymmetrical encryption methods, are used for this purpose.

The employed codes and encryption methods constitute secrets that need to be kept hidden from attackers. Other uses in security-relevant areas, for instance, concern the protection against unauthorized modifications, such as the storing of changed serial numbers or odometer readings, the prevention of unauthorized tuning measures, etc.

Hence it is necessary to provide secure environments in control units, in which functionalities that must have access to and/or modify these secrets can be executed. These environments normally have a secure computer unit or CPU, also referred to as secure CPU, as well as a storage module. An environment of this type is called a hardware security module (HSM) in this context. It represents a high-performance module which includes hardware and software components and improves the security and trustworthiness of embedded systems. The HSM helps in particular in protecting security-critical applications and data. The security costs are also able to be reduced by an HSM, while effective protection against attackers is offered at the same time. As far as the basic structure of an HSM is concerned, reference is made to FIG. 3.

When third parties attack a control unit, they attempt to manipulate the operation of the main computer provided in the control unit and/or the functional sequence of the control unit software. If a manipulation is detected, either only a detection of the manipulation in the region of embedded systems or in the embedded region occurs, or an operation under emergency conditions is triggered. Healing of the system, i.e., the control unit and the software that is running thereon, takes place only if explicit reprogramming is carried out in the customer service facility. In the field of consumer electronics, e.g., in the case of TV receivers, smartphones, etc., self-healing is triggered from the outside, for instance by a user, server, etc.

SUMMARY OF THE INVENTION

Against this background, a method having the features described herein, an electronic hardware security module as described herein, and a control unit as described herein are provided. Further refinements can be gathered from the further descriptions herein and the specification.

According to the method provided, once a manipulation of the HSM has been detected and after a check has taken place whether reprogramming is an option, the HSM automatically initiates the reprogramming for self-healing of the system or the control unit in one specific development. An independent detection and self-healing by a kind of integrated security watchdog, i.e., the electronic hardware security module (HSM), therefore takes place in the corrupted system or control unit. This minimizes security risks and comfort losses.

The HSM detects the manipulation of the main computer or main core in the control unit or the ECU and starts the self-healing process. The self-healing is performed by reprogramming. The trustworthy software for the reprogramming is either stored

- in the HSM flash memory of the affected ECU,
- in a flash memory of an unaffected ECU, which is networked with the affected ECU,
- in the HSM flash memory of an unaffected ECU, which is networked with the affected ECU,
- in the secure HSM flash memory of a trusted cloud, which is networked with the affected ECU,
- in the secure memory of a trusted cloud, networked with an unaffected ECU, which is networked with the affected ECU.

A classic bus system or a secure bus system may be used for the transmission. For example, the HSM security bus may be used.

Additional advantages and developments of the present invention derive from the specification and the appended drawing.

It is understood that the features mentioned above and the features yet to be described may be used not only in the individually given combination but in other combinations or in isolation as well, without departing from the scope of the present invention.

DETAILED DESCRIPTION

Figure 1:
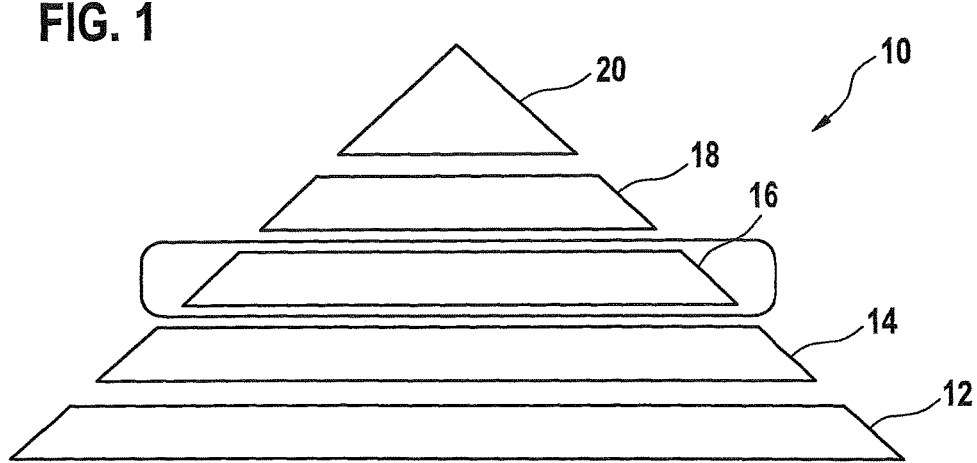
FIG. 1 shows a trust pyramid.

The present invention is represented schematically in the drawing on the basis of specific embodiments and is described in detail in the following text with reference to the drawing.

To trust an IT system that it will always act as expected requires trust in all of the incorporated layers, one after the other, in order to create a trustworthy IT system.

FIG. 1 shows a trust pyramid for a typical IT system. It is provided with reference number 10 overall and includes one layer for organizational security 12, one layer for system security 14, one layer for hardware security 16, one layer for software security 18, and an uppermost layer for trust 20.

Trust in the entire IT system requires that each layer is able to rely on the effective security of the layer situated underneath, without having the ability to verify this fact independently. For example, this means that it is possible that a perfect software and hardware security solution may turn out to be useless because of a weak security system configuration situated underneath. Moreover, it may be the case that a potential weakness in the system configuration will not be detected or prevented by the upper hardware and software layers.

In contrast to typical back and IT systems, the hardware layer of embedded systems is frequently exposed to physical attacks that influence hardware or software functionalities through a physical arrangement, e.g., manipulate a flash memory or deactivate alarm functionalities. One particular approach for making such physical attacks more difficult is the use of manipulation-proof hardware security modules (HSM), such as those shown in FIG. 2, for instance. Such an HSM protects important information, for example personal identification numbers (PIN), secure keys and critical operations such as a PIN verification, data encryption, e.g., by strong physical shielding.

The manner in which an HSM may be developed and the kind of functionalities that are able to be performed thereby in order to improve the security of an embedded system will be shown in the following text.

Figure 2:
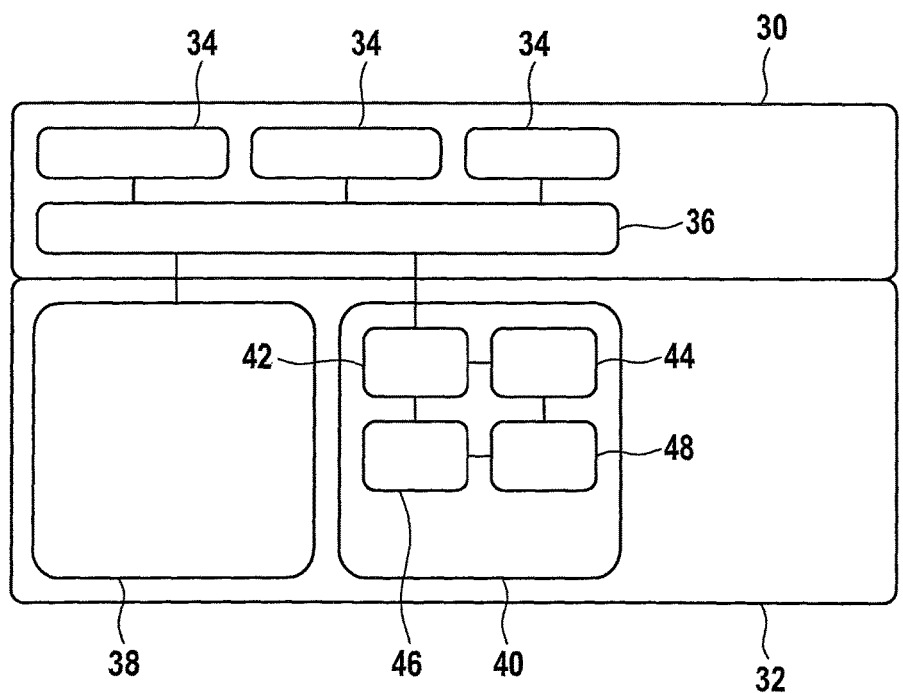
FIG. 2 shows functionalities of an HSM in a schematic representation.

FIG. 2 depicts the core functionalities of a typical hardware security module. The illustration shows a software layer 30 and a hardware layer 32 which is protected against unauthorized access.

Software layer 30 includes a number of applications 34, three of which are shown in this instance. An operating system 36 is provided in addition. Hardware layer 32 includes embedded standard hardware 38 and a hardware security module (HSM) 40. A first block 42 in this HSM 40 is provided for interfaces and the control, a second block 44 is provided for secure encryption functionalities, a third block 46 is provided for secure functionalities, and a secure memory 48 is included.

Secure memory 48 is a small, non-volatile data memory, e.g., having a capacity of a few kilobytes, within manipulation-proof HSM 40, so that an unauthorized readout, or a manipulation or deletion of critical information, e.g., of cryptographic keys, cryptographic certificates or authentication data such as PINs or passwords, is prevented. In addition, secure memory 48 of HSM 40 holds all HSM configuration information, such as information pertaining to the owner of HSM 40, or access authorizations to secure internal units.

Second block 44 for secure encryption functionalities holds cryptographic algorithms which are used for data encryption and decoding, such as AES or 3DES, a data integrity amplification, such as MAC or HMAC, or a data origin verification, e.g., through the use of digital signature algorithms such as RSA or ECC, as well as all associated cryptographic activities, such as key generation and key verification, for instance.

Secure functionalities in third block 46 include all protected functionalities that are not directly assigned to a cryptographic method, HSM 40 serving as physically protected "trust anchor". For example, this may be a physically protected clock signal, an internal random-number generator, a loading routine protection mechanism or some other critical application functionality, for instance for realizing a secure dongle.

First block 42 for interfaces and the control includes the internal HSM logic, which implements the HSM communication with the external world and administers the operation of all internal basic components such as the ones previously mentioned.

All functional basic components of hardware security module 40, as described above, are surrounded by an uninterrupted physical boundary, which prevents internal data and processes from being monitored, copied or cloned or manipulated. This could enable an unauthorized user to use or compromise internal secrets. The cryptographic boundary is commonly implemented by algorithmic and physical time channel countermeasures with a dedicated access protection arrangement, such as special shielding or layers, in order to enable side channel resistance, access reporting, access resistance or an access response, for instance.

The manner in which HSM 40 is able to improve the security of an embedded product solution will be elucidated in the following text.

HSM 40 protects critical information, e.g., identities, cipher keys or keys, with the aid of the physical shield which cannot be circumvented by software susceptibility.

HSM 40 is able to assist in detecting, weakening or deterring powerful POI attackers (POI=point of interest) by implementing effective side channel resistance and access protection barriers, which, among other things, have severe access restrictions that apply even to authorized users. For example, some information is always held within HSM 40 exclusively.

HSM 40 is able to accelerate security mechanisms, in which certain acceleration switching circuits are utilized.

The use of HSM 40 makes it possible to reduce the security costs by adding highly optimized special switching circuits, for instance for standardized cryptography.

Figure 3:
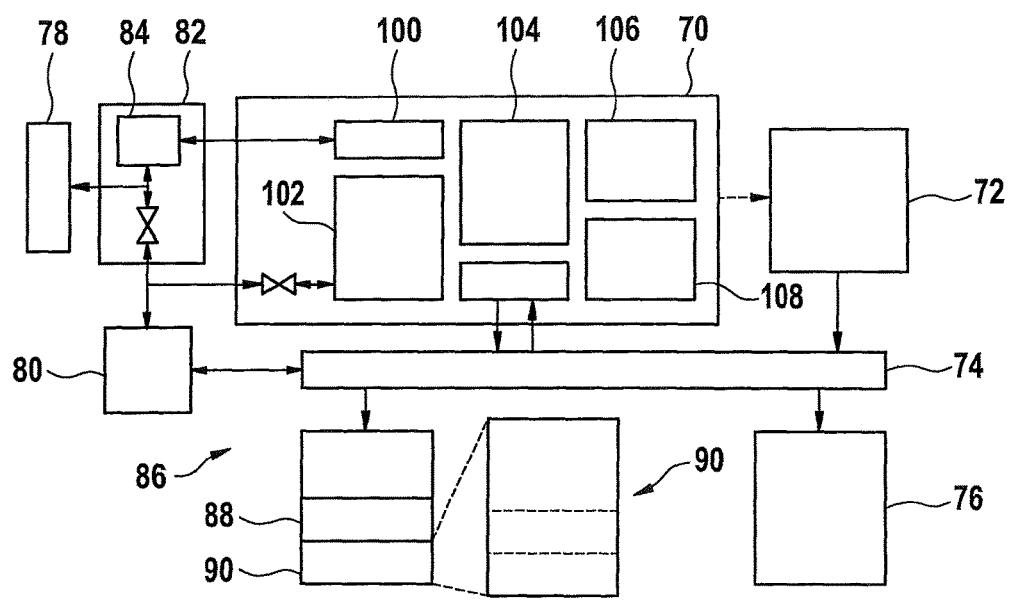
FIG. 3 shows the structure of one specific embodiment of the HSM in a schematic representation.

One possible structure of the HSM is shown in FIG. 3. It shows HSM 70, which is embedded in an environment. The figure depicts a main computer unit 72, a system bus 74, a RAM component 76 having an area for joint use, and a test program 78 or debugger including associated hardware 80 and interface 82, which in turn includes a register 84. Moreover, the figure shows a memory component 86 for flash code having a data area 88 and a secure area 90, in which secure core data are contained.

Provided in HSM 70 are an interface 100 to test program 78, a secure computer core 102, a secure RAM component 104, a random-number generator 106, e.g., a TRNG or PRNG, and a key 108, e.g., AES.

Figure 4:
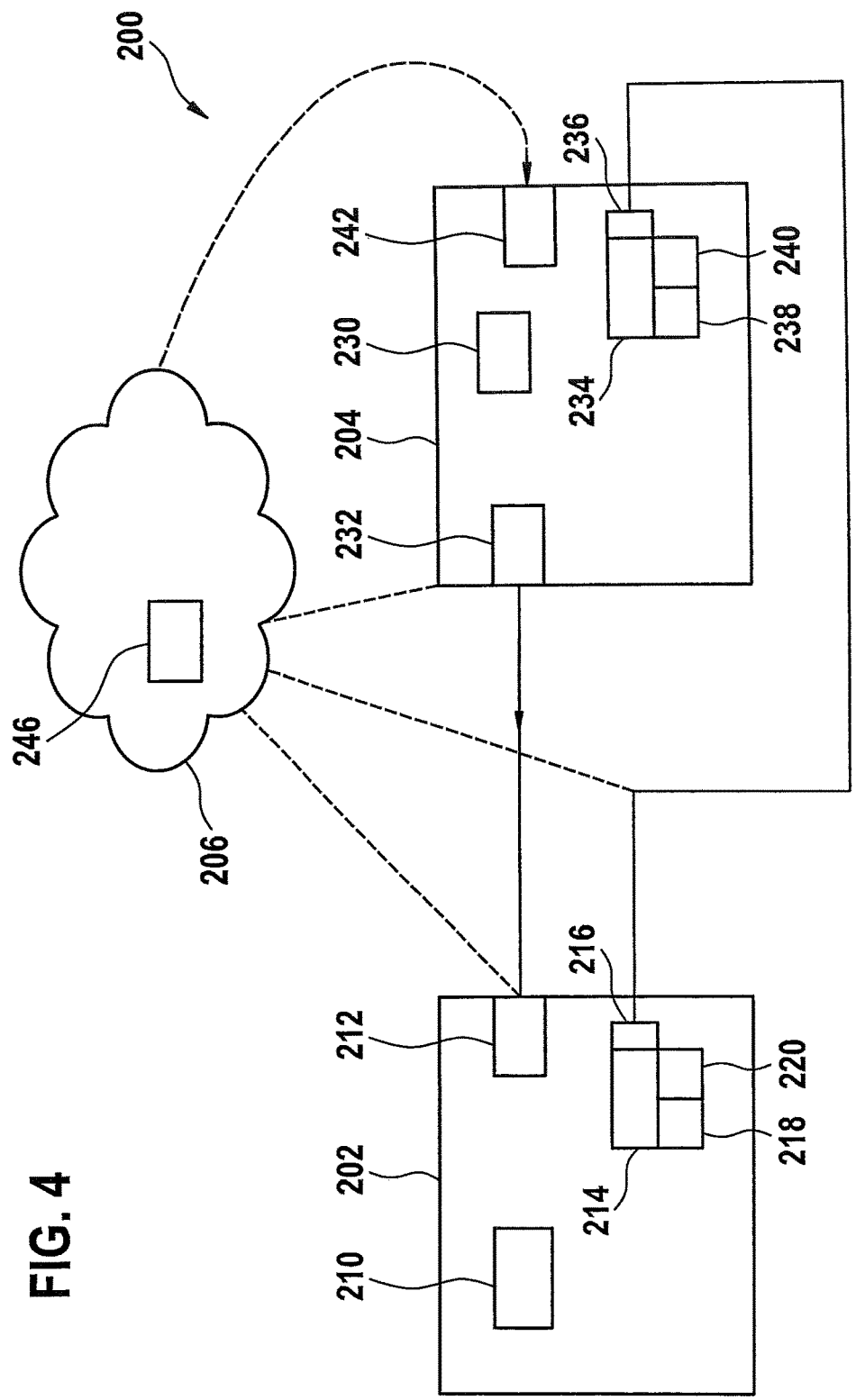
FIG. 4 shows a control unit interconnection.

FIG. 4 shows a control unit interconnection, which is designated by reference numeral 200 overall. This control unit interconnection 200 includes a first control unit 202 and a second control unit 204. In addition, the figure shows a cloud 206, which is a trusted cloud in this instance.

First control unit 202 has a first main computer unit 210, a first communication interface 212, and a first electronic hardware security module (HSM) 214, to which an interface 216 is in turn assigned and a flash memory 218 as non-volatile memory, as well as a RAM component 220 as volatile memory.

Second control unit 204 has a second main computer unit 230, a second communication interface 232, and a second electronic hardware security module (HSM) 234, to which an interface 236 is in turn assigned and a flash memory 238 as non-volatile memory, as well as a RAM component 240 as volatile memory. Moreover, an additional communication interface 242 is provided.

Cloud 206 has a secure memory 246, in which data or software for reprogramming may be stored. As an alternative or in addition, the software can be stored in first flash memory 218 and/or second flash memory 238. If a manipulation of first control unit 202 or first main computer unit 210 of first control unit 202 has occurred, the manipulation is detected by first HSM 214. It then also starts the reprogramming; the software required for the reprogramming may be stored in first flash memory 218, in second flash memory 238, and/or in secure memory 246 of cloud 206.

Figure 5:
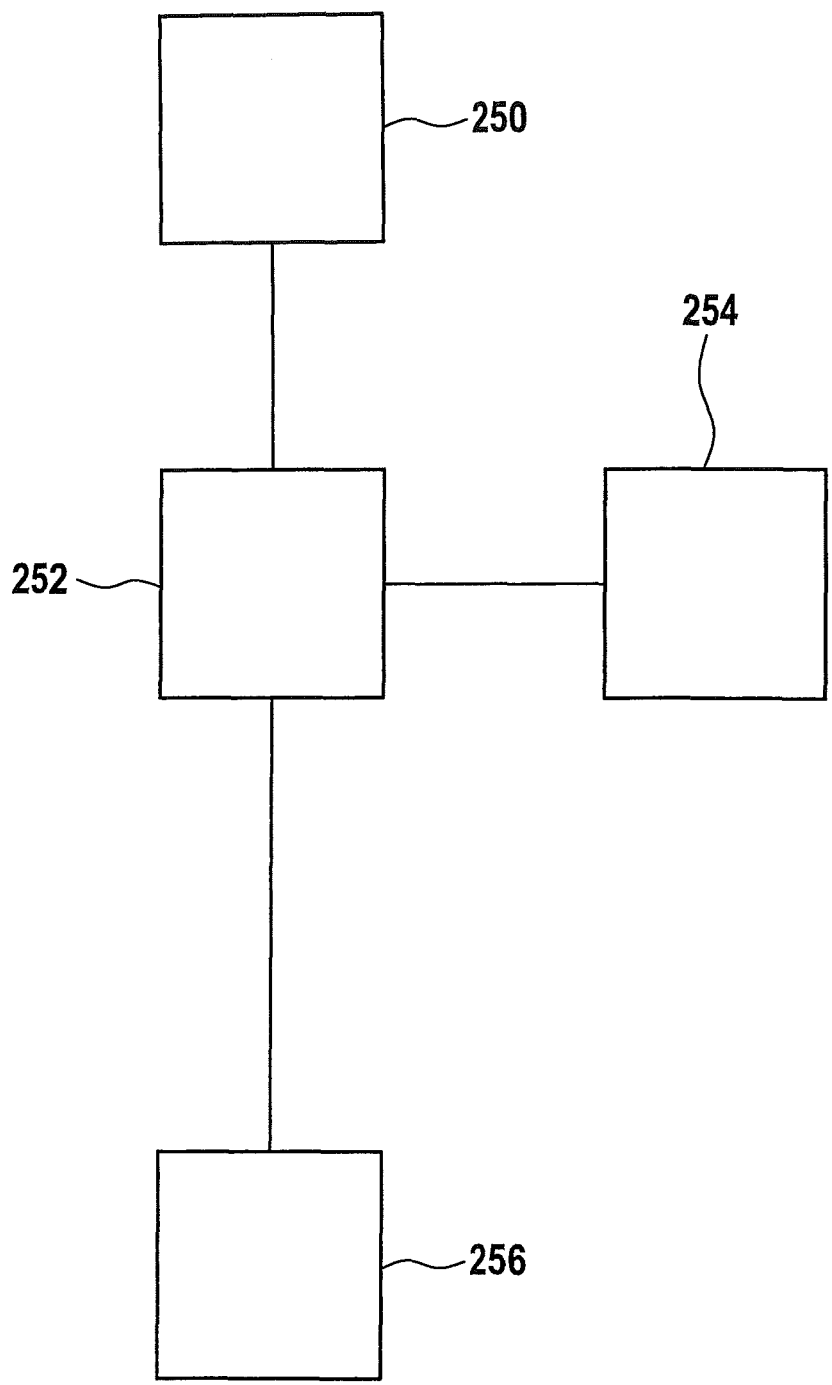
FIG. 5 shows a possible sequence of the introduced method.

FIG. 5 shows a possible sequence of the described method in the form of a flow chart. In a first step 250, it is checked whether a fault exists in the operation of the control unit. If this is the case, it is checked in a next step 252 whether reprogramming is an option. This may depend on the operating state of the motor vehicle, for example. It may be necessary for the motor vehicle to be at standstill, for instance. In addition, this may depend on whether a trusted code for the reprogramming is available to begin with. If a reprogramming is not possible, an alternative reaction takes place in a step 254, such as the initiation of running under emergency conditions.

If the check in step 252 reveals that reprogramming is possible, it will be carried out in a final step 256. The control unit software, including codes and data, is able to be reestablished in so doing.

What is claimed is:

1. A method for operating a control unit, which has an electronic hardware security module surrounded by a physical shielding that prevents monitoring of the electronic hardware security module, and a main computer located outside the electronic hardware security module, the method comprising:
   detecting, by the electronic hardware security module surrounded by the physical shielding that prevents monitoring of the electronic hardware security module, a manipulation of the main computer unit located outside of the electronic hardware security module;
   performing, by the electronic hardware security module, a check of whether reprogramming of the main computer unit is possible, the performing the check of whether reprogramming is possible including determining whether a vehicle in which the control unit is located is stationary; and
      initiating, by the electronic hardware security module, the reprogramming of the main computer unit upon the check indicting that the reprogramming is possible.

2. The method of claim 1, wherein an alternative reaction is triggered if reprogramming is not possible.

3. The method of claim 1, wherein software required for the reprogramming is stored in a non-volatile memory of the electronic hardware security module of the control unit.

4. The method of claim 1, wherein the software required for the reprogramming is stored in a non-volatile memory of an electronic hardware security module of a further control unit.

5. The method of claim 1, wherein the software required for the reprogramming is stored in a memory of a cloud.

6. The method of claim 5, wherein the cloud is connected to the control unit.

7. The method of claim 5, wherein the cloud is networked with a further control unit, which is networked with the control unit.

8. The method of claim 1, wherein the step of performing a check of whether reprogramming is possible includes determining whether trusted code for reprogramming is available.

9. The method of claim 1, wherein the electronic hardware security module is surrounded by an uninterrupted physical boundary.

10. The method of claim 9, wherein the uninterrupted physical boundary includes a cryptographic boundary.

11. The method of claim 1, further comprising:
   continuously monitoring, by the electronic hardware security module, for a manipulation of the main computer unit.

12. The method of claim 1, wherein the reprogramming is automatically performed by the electronic hardware security module in response to the detection of a manipulation of the main computer.

13. The method of claim 1, wherein the electronic hardware security module includes a processor and a memory.

14. The method of claim 1, wherein the main computer unit is located outside the physical shielding that prevents monitoring of the electronic hardware security module.

15. An electronic hardware security module, which is used in a control unit having a main computer unit, comprising:
   a secure computer core surrounded by a physical shielding that prevents monitoring of the electronic hardware security module, wherein the secure computer core is configured to:
      detect a manipulation of the main computer unit located outside the electronic hardware security module;
      check whether reprogramming of the main computer unit is possible, the check of whether reprogramming is possible including determining whether a vehicle in which the control unit is located is stationary; and
      initiate the reprogramming of the main computer unit upon the check indicting that the reprogramming is possible.

16. The electronic hardware security module of claim 15, further comprising: a flash memory in which a software required for the reprogramming is stored.

17. The electronic hardware security module of claim 15, further comprising a flash memory, surrounded by the physical shielding that prevents monitoring of the electronic hardware security module, in which a software required for the reprogramming is stored.

18. A control unit, comprising:
   a main computer unit located outside of an electronic hardware security module; and
   the electronic hardware security module, surrounded by a physical shielding that prevents monitoring of the electronic hardware security module, including:
      a secure computer core configured to:
         detect a manipulation of the main computer unit;
         check whether reprogramming of the main computer unit is possible, the check of whether reprogramming is possible including determining whether a vehicle in which the control unit is located is stationary; and
         initiate the reprogramming of the main computer unit upon the check indicting that the reprogramming is possible.

19. The control unit of claim 18, wherein the electronic hardware security module further includes a flash memory, surrounded by the physical shielding that prevents monitoring of the electronic hardware security module, in which a software required for the reprogramming is stored.

* * * * *